United States Patent
Cameron et al.

(10) Patent No.: US 6,317,490 B1
(45) Date of Patent: Nov. 13, 2001

(54) METHOD AND APPARATUS FOR REAL-TIME BILLING ACCOUNT QUERY

(75) Inventors: Garnet Cameron, Dallas; Lester Son-Hing, Plano; Rita D'Ingianni, Richardson; Raman Lad; Nimesh Shah, both of Plano; Rodney Glen Adams, Rowlett, all of TX (US)

(73) Assignee: Nortel Networks Limited, St. Laurent (CA)

( * ) Notice: Subject to any disclaimer, the term of this patent is extended or adjusted under 35 U.S.C. 154(b) by 0 days.

(21) Appl. No.: 09/000,756

(22) Filed: Dec. 30, 1997

(51) Int. Cl.$^7$ .................................................. H04M 15/00
(52) U.S. Cl. ............... 379/114.01; 379/111; 379/112.01; 379/114.01; 379/114.03; 379/121.04
(58) Field of Search .................................. 379/112, 114, 379/115, 121, 127, 144, 111, 172.01, 112.06, 114.01, 114.03, 114.05, 114.06, 121.04, 133; 455/406, 407, 408

(56) References Cited

U.S. PATENT DOCUMENTS

| | | | |
|---|---|---|---|
| 4,979,207 | * | 12/1990 | Baum et al. ...................... 379/112 |
| 5,068,891 | * | 11/1991 | Marshall ............................ 379/91 |
| 5,103,475 | * | 4/1992 | Shuen .............................. 379/115 |
| 5,333,183 | * | 7/1994 | Herbert ............................ 379/112 |
| 5,506,893 | * | 4/1996 | Buscher et al. ................... 379/114 |
| 5,517,555 | * | 5/1996 | Amadon et al. ................... 379/59 |
| 5,524,142 | * | 6/1996 | Lewis et al. ..................... 379/112 |
| 5,615,134 | * | 3/1997 | Newsham et al. ................. 364/550 |
| 5,619,557 | * | 4/1997 | Van Berkum ...................... 379/88 |
| 5,627,887 | | 5/1997 | Freedman ........................ 379/144 |
| 5,692,037 | * | 11/1997 | Friend ............................ 379/114 |
| 5,696,906 | * | 12/1997 | Peters et al. .................... 395/234 |
| 5,784,442 | * | 7/1998 | Foti .............................. 379/114 |
| 5,832,068 | * | 11/1998 | Smith ............................. 379/113 |
| 5,841,847 | * | 11/1998 | Graham et al. ................... 379/114 |
| 5,844,972 | * | 12/1998 | Jagadish et al. ................. 379/114 |
| 6,047,050 | * | 4/2000 | Rothenhofer et al. ............. 379/112 |
| 6,084,953 | * | 7/2000 | Bardenheuer et al. ............. 379/114 |
| 6,104,704 | * | 8/2000 | Buhler et al. ................... 370/252 |
| 6,125,173 | * | 9/2000 | Jagadish et al. ................. 379/112 |

FOREIGN PATENT DOCUMENTS

| | | |
|---|---|---|
| 0526118 | 2/1993 | (EP) . |
| 0647055 | 4/1995 | (EP) . |
| 0656733 | 6/1995 | (EP) . |

* cited by examiner

*Primary Examiner*—Sinh Tran
*Assistant Examiner*—Quoc Tran
(74) *Attorney, Agent, or Firm*—Carr & Storm, L.L.P.

(57) ABSTRACT

A telecommunications service billing administrator for providing real-time billing query functionality. The billing administrator has a billing system with a processor coupled to a billing information data repository. The billing information data repository updates an account table and a call table during the placement of a telecommunications call leg. The information updated includes a billing account summary. The subscriber can issue a billing inquiry request in which the billing system responds with an announcement of the billing account summary.

14 Claims, 7 Drawing Sheets

METHOD AND APPARATUS FOR REAL-TIME BILLING ACCOUNT QUERY

TECHNICAL FIELD

The present invention relates to a method and apparatus for manipulating telephony service information, and in particular to a method and apparatus for providing real-time telephony service billing information queries.

BACKGROUND OF THE INVENTION

Presently, telephony service billing is conducted periodically. At the end of the billing period, the accumulated call data stored on telecommunications switches is downloaded to a facility that combines data for a subscriber and then compiles a summarized billing for the subscriber which is sent for payment.

Due to this accounting structure, a subscriber cannot access the billing information for an up-to-date or real-time billing summary. Such information is important to a subscriber, particularly with the advent of per-use charge features and for cellular service subscribers, to determine whether or not a budgetary limit is being exceeded. Under the present system, a user will not know whether a limit has been exceeded until receiving their services bill.

Therefore, a need exists for a telecommunications system billing administrator that can maintain a billing information data repository for real-time queries by a user when requested. Furthermore, a need exists for system that allows a real-time query in an expedient manner such that a user or subscriber need not wait an extended period to receive the information.

SUMMARY OF THE INVENTION

Accordingly, provided herein is a method and apparatus for providing real-time telephony service billing information queries.

A telecommunications service billing administrator has a billing system with a processor coupled to a billing information data repository. The billing information data repository updates an account table and a call table during the placement of a telecommunications call leg. The information updated includes a billing account summary. At least the billing account summary is accessible by a subscriber through a user interface coupled to the billing system. The subscriber can then issue a billing inquiry request in which the billing system responds with the billing account summary in either voice announcement form, if a voice access device was used to access the billing system, or in data announcement form.

BRIEF DESCRIPTION OF THE DRAWINGS

For a more complete understanding of the present invention, and the advantages thereof, reference is made to the following description taken in conjunction with the accompanying drawings, wherein.

DETAILED DESCRIPTION

The principles of the present invention and their advantages are best understood by referring to the illustrated embodiment depicted in the FIGURES, in which like reference numbers describe like parts.

Figure 1:
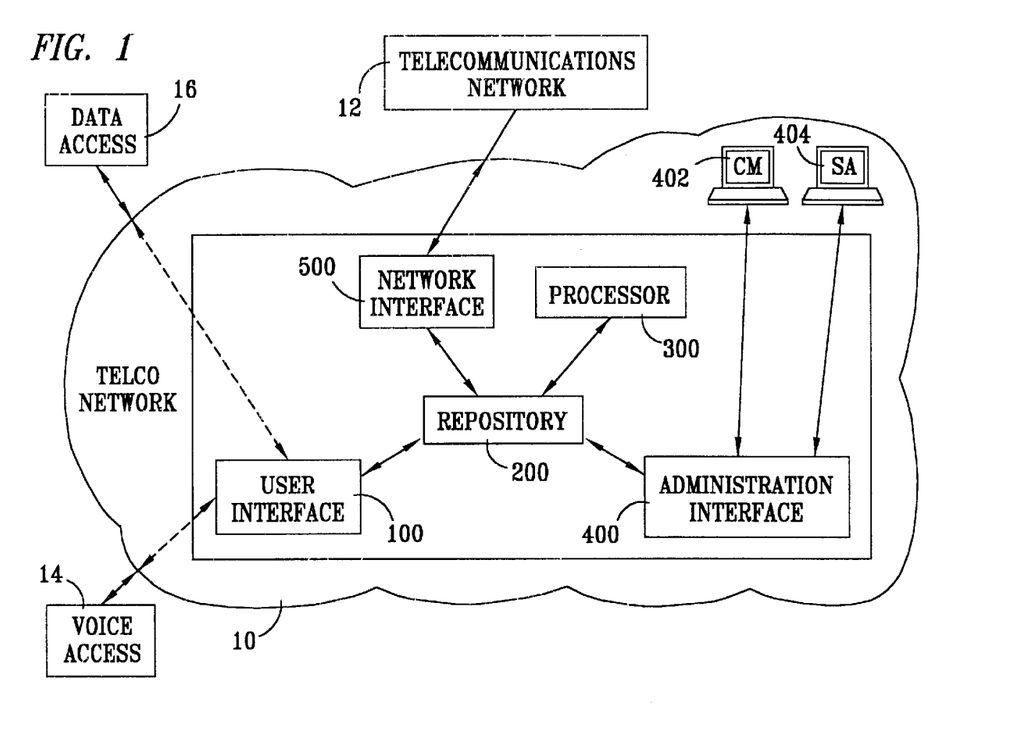
FIG. 1 is illustrates is a telecommunications service billing administrator of the present invention coupled to a telecommunications network.

FIG. 1 illustrates is a telecommunications service billing administrator 10 of a telecommunications network 12. The processes described herein with respect to the billing administrator 10 and the telecommunications network 12 are preferably performed by software (or software modules) that are executed within a typical computer system (not shown) that includes one or more general-purpose or special-purpose processors, memory, I/O, etc.

For a user account query session, the billing administrator 10 has a user interface 100 that is coupled to a billing information data repository ("BIDR") 200. Access to the network 10 is provided through a voice access device 14 or a data access device 16 selectively coupled to the user interface 100. The user interface 100 allows a telecommunications subscriber through the voice access device 14 or the data access device 16 to query their billing account for real-time usage data contained with the BIDR 200.

The BIDR 200 is coupled to a billing processor 300. The billing processor 300 performs billing queries or other database processing functions on the BIDR 200 as requested by a subscriber through the user interface 100.

The BIDR 200 is also coupled to an administration interface 400 that provides the billing administrator 10 with customer maintenance ("CM") and system administration ("SA") capabilities. Customer maintenance is provided through a CM terminal 402 to create, modify and delete user billing accounts including authorization maintenance. System administration is provided through a SA terminal 404 to create, modify, or delete user billing account parameter definitions and system management. Operations that currently exist for billing administration remain accessible through this interface.

The billing administrator 10 is accessed by the telecommunications network 12 through a network interface 500 coupled to the BIDR 200. The network interface 500 provides the telecommunications network 12 with ability to query and to conduct real-time updates of user billing data on the BIDR 200. Preferably, the network interface 500 is provided by the BIDR 200.

The telecommunications network 12 is a carrier having either an inter-exchange carrier ("IXC"), a local-exchange carrier ("LEC"), or a combination of both. The telecommunications network 12 can be either a landline network, a wireless network, or a hybrid network having a combination of landlines and wireless telecommunications structure. The system of this invention is adapted for analog or digital cellular telephones, radiophones in personal communication service networks (PCS) and other wireless communication systems where it is desirable that real-time call accounting is available.

For example, a user accesses a carrier through the access devices 14 or 16, accordingly, to query their account on the BIDR 200. Gatekeeper access to the billing account is conducted with an access number, such as a personal identification number ("PIN"), an account number, and a user defined password. The user billing record in real-time is sent to the inquiring party in either a voice announcement form, if a voice access device 14 was used to access the billing administrator 10, or in data announcement form, if a data access device 16 was used to access the billing administrator 10. The term "coupled" as used herein means possesses communication links between the network components that allow the bi-directional flow of data and information.

Figure 2:
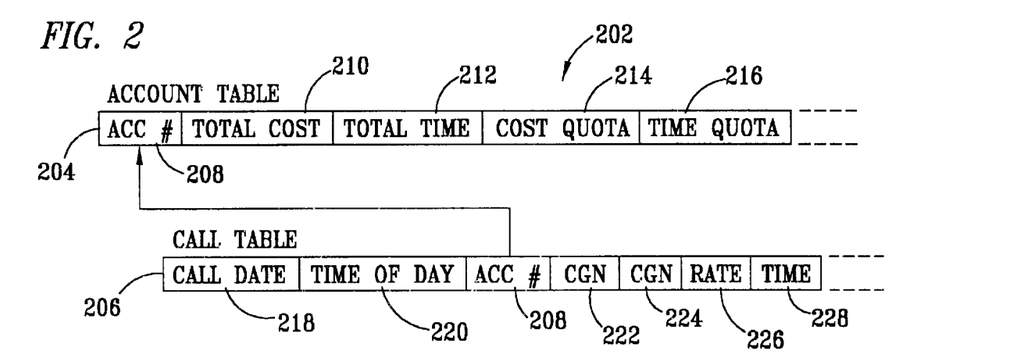
FIG. 2 is an illustration of a billing information data repository ("BIDR") structure of the present invention.

FIG. 2 shows a BIDR data model 202 for billing data stored on the BIDR 200. The BIDR data model 202 has at least an account table 204 for subscriber account information and a call table 206 for call information accumulated by the activities of a subscriber.

The account table 204 has an account number field 208 identifying billing data belonging to one subscriber and the table key; a total cost field 210 containing a real-time cost with respect to costs, a total time field 212 containing a real-time total of connect time to date used by the subscriber; a cost quota field 214 designating any maximum cost thresholds of the subscriber; and a time quota field 216 designating any connect-time thresholds of the subscriber.

The call table 206 is relationally-linked to the account table 204 through the account number field 208. The call table 206 has multiple records representing each phone call placed by a subscriber.

The call table 206 has a call date field 218 containing information of the date a call was made; a time-of-day field 220 containing information regarding the time a call was made and serves as a table key; a calling number field 222 containing information regarding the telephone number placing the call; a called number field 224 containing information regarding the telephone number called; a rate field 226 containing information regarding the billing rate of the call placed; and a time field 228 containing information regarding the call-time length.

Accordingly, access to the BIDR 200 and the account table 204 and the call table(s) 206 can be made through either the user interface 100, the network interface 500, or the administrative interface 400.

Figure 3:
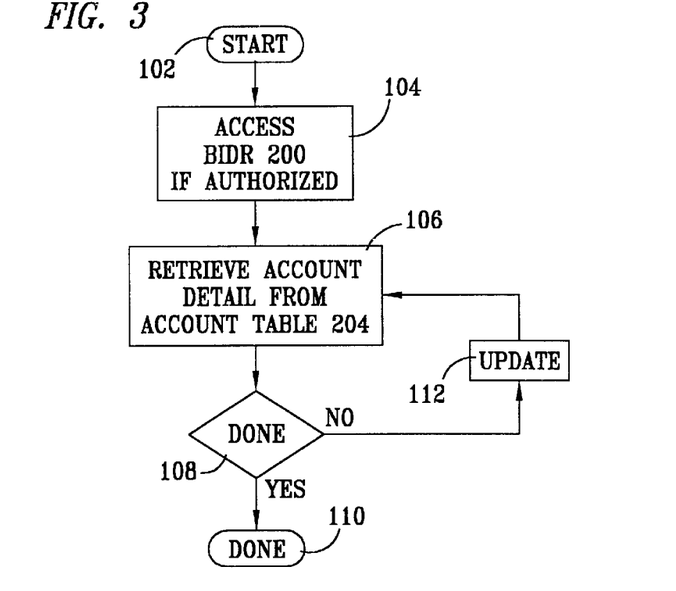
FIG. 3 presents a flow chart illustrating the processing conducted by a user interface with the BIDR.

FIG. 3 presents a flow chart illustrating the processing conducted with the user interface 100. In step 302, the user interface 100 is initially accessed by a subscriber through either a voice access device 14 or a data access device 16.

In step 304, access to the BIDR 200 by a subscriber is allowed if authorized. Access to the BIDR 200 is authorized if the subscriber enters the appropriate security information, discussed above. Otherwise, the access is barred and the call dropped.

If access to the BIDR 200 is authorized, then in step 306, account details are retrieved from the account table 204, such as the total cost of calls placed from the total cost field 210, the total time of calls placed from the total time field 212, and the quotas or thresholds on the call-cost and time-costs from cost quota field 214 and time quota field 216.

With account data retrieved by the subscriber in step 306, the subscriber can designate in step 308 to exit in step 310 or update authorization access data in step 312. If exit is selected, then in step 310 the user interface drops the call made by the subscriber.

Figure 4:
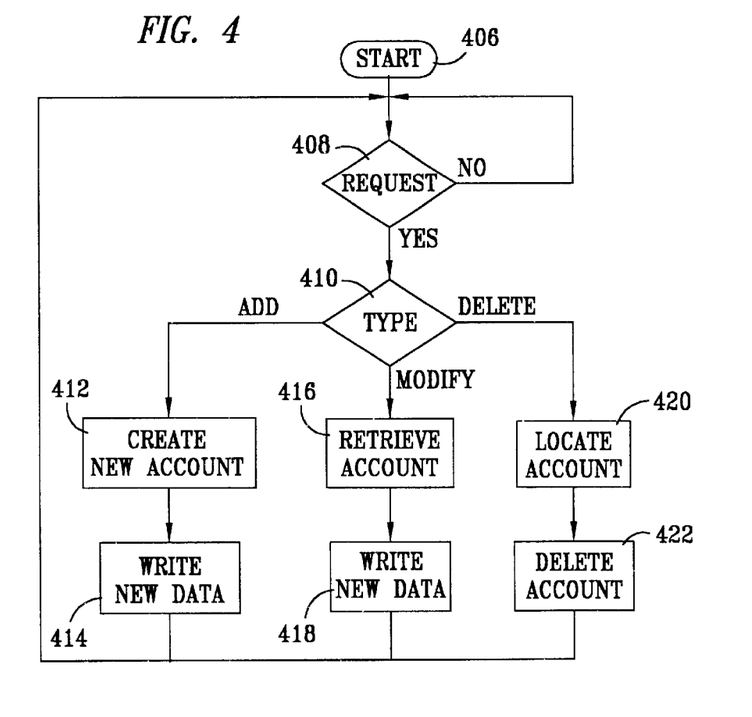
FIG. 4 presents a flow chart illustrating the processing conducted by a customer maintenance administrative interface with the BIDR.

FIG. 4 presents a flow chart illustrating the processing conducted with the CM administrative interface 400. An access request message is transmitted by the CM terminal 402. Upon receipt of an access request message in step 408, the type of message is determined in step 410.

If the access request message is an "Add" message, then in step 412, a new account is created in the BIDR 200 by generating a new account table 204 and associated call tables 206. In step 414, the subscriber data is written to the account table 204 and associated call tables 206 relating to the new subscriber.

If the access request message is a "Modify" message, then in step 416, an account is retrieved from the BIDR 200 relating to the account number passed through the "Modify" message. Data contained in the "Modify" message, in step 418, is accordingly written to the BIDR 200 account table 204 and call table(s) 206 relating to that account number.

If the access request message is a "Delete" message, then in step 420, an account is retrieved from the BIDR 200 relating to the account number passed through the "Delete" message. In step 422, the account table 204 and the call table(s) 206 are deleted from the BIDR 200.

The SA terminal 404 posses CM administration call capability as well as a system control as necessary for any database administration, including storage formatting (for framing).

Figure 5:
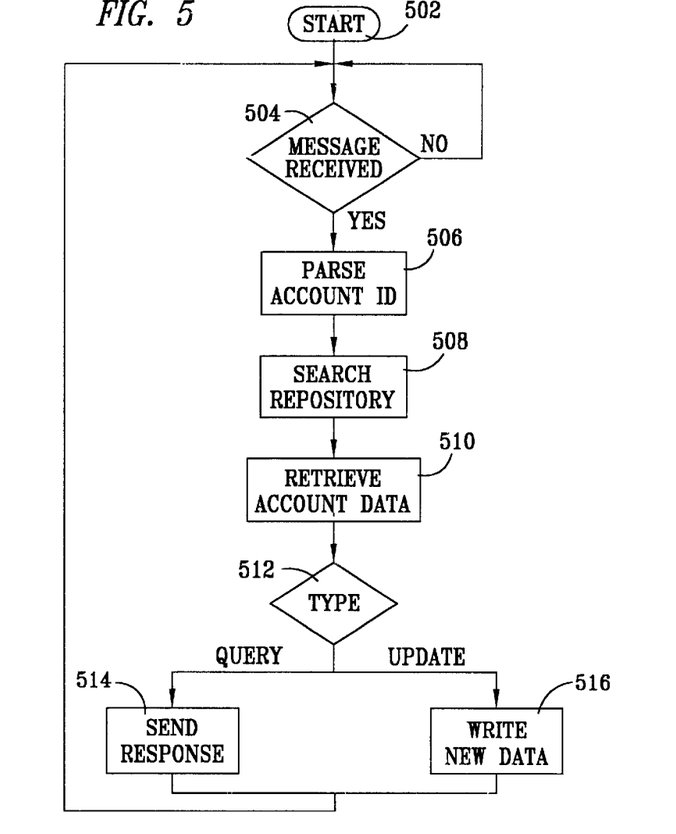
FIG. 5 presents a flow chart illustrating the processing conducted by a network interface to access the BIDR.

FIG. 5 presents a flow chart illustrating the processing conducted with the network interface 500 with access by the telecommunications network 12 to the BIDR 200. The network interface 500 in steps 502 and 504 waits for an access request message from the telecommunications network 12. The access request message from the network 12 is either a "Query" request on the BIDR 200 or an "Update" request on the BIDR 200.

Upon receipt of an access request message, in step 506 the billing processor 300 parses the account number fields 208 of the account table 204 in the BIDR 200. In step 508 the BIDR 200 is searched for the information queried by the network 12. The queried data from step 508 is retrieved in step 510. In step 512, if the access request is a "Query," then in step 514 the queried data is sent to the requesting network 12. If the access request is an "Update," then in step 516 the data presented by the network 12 is written into the BIDR 200 in the account table 204 and the call table 206. Typically, the presented data is call information, thus generating another call table record 206 or modifying an existing call-table record 206 in the BIDR 200. The total values in the total cost field 210 and the total time field 212 are redetermined to reflect the additional call parameters. After completing the "Query" or the "Update," the network interface 500 returns to polling for access request messages in step 504.

Figure 6:
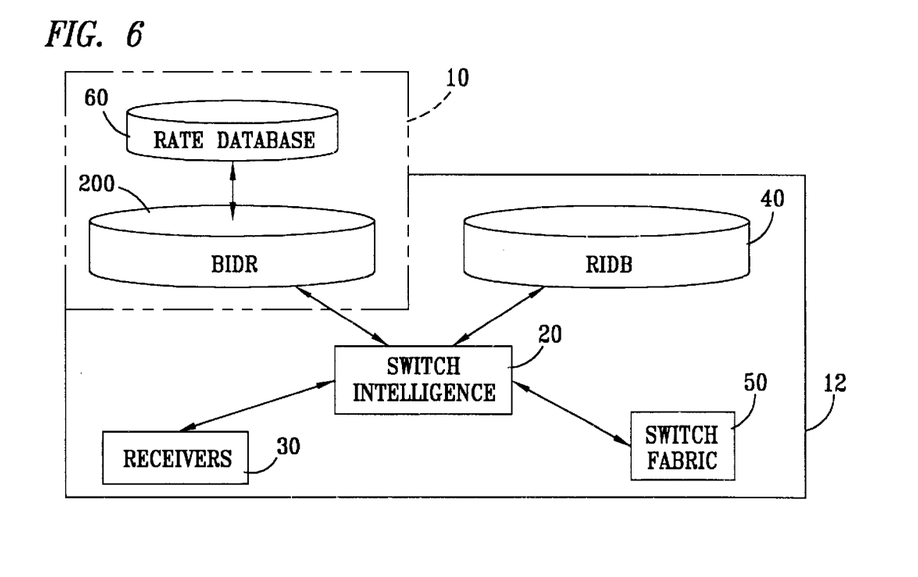
FIG. 6 is a block diagram illustrating a coupling of the billing administrator of the invention with an apparatus of a telecommunications network.

In FIG. 6 shown is a block diagram relating the billing administrator 10, shown in phantom lines, to the telecommunications network 12. The billing administrator 10 is understood to be coupled to the telecommunications network 12 through the network interface 500.

The telecommunications network 12 has a switch intelligence ("SI") unit 20 that contains program logic for call processing and real time billing data generation. The SI unit 20 is coupled to one or more signal receivers 30, a routing information database ("BIDR") 40 that contains call routing information used for call processing, and a switch fabric ("SF") unit 50 that contains communications links and other switch hardware and firmware. A rate database 60 is accessible through the BIDR 200 for providing call rate information for calculation of call values in the BIDR 200 tables.

It will be understood that the SI unit 20 (and its components), BIDR 40, SF unit 50, and BIDR 200, are generally implemented using software operating within a computer system. Such a computer system may be a proprietary system, UNIX workstation or NT-based workstation, for example. The software may be implemented in any language such as C++, Java, Smalltalk, or other language.

The SF unit 50 provides the switching functions or fabric within the network 12. As will be appreciated, any number of SF units may be utilized in the network 12 depending on design characteristics. The SI unit 20 functions as a concurrent station machine processing system that processes a call within the network 12 and controls the SF unit 50.

The messaging between the SI unit 20 and the BIDR 200 through the network interface 500 is shown in TABLE 1:

TABLE 1

| Message | Description |
|---|---|
| Originate Billing Query (Charge, Call Type Info) | Allows the SI 20 to query the BIDR 200 for billing data on subscriber accounts |
| Originate Billing Response (Charge, Call Type Info) | response to the Originate Billing Query |
| Originate Billing Update (Charge, Call Type Info) | Alerts the RIBD that a call has been established or terminated and provides the relevant call data to the RIBD 200 for processing. |
| Billing Update (Charge, TPs) | Optional periodic updates on call status to the RIBD 200 to the SI 20. |
| Clear Billing Update (Charge, TPs) | Indicates a call teardown and the start of final processing at the RIBD 200. |

Through the messaging between the telecommunication network 12, the billing account data from numerous carriers can be accumulated and totaled in the BIDR 200 with the total cost field 210 and the total time field 212 of the subscriber account table 204.

Figure 7:
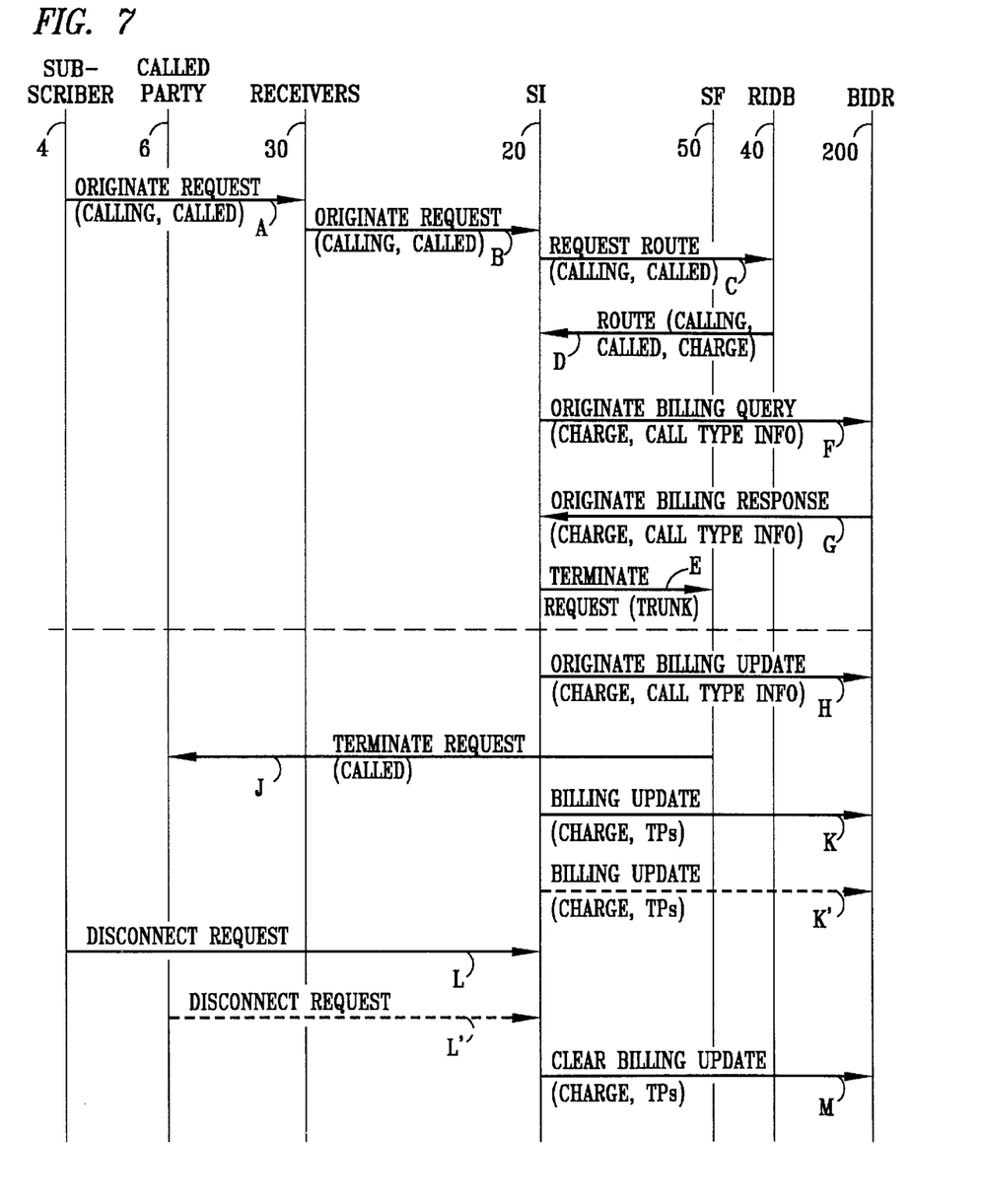
FIG. 7 is a billing update functional message flow diagram for a single telecommunications network carrier having a billing administrator of the present invention.

Referring to FIG. 7, shown is a billing update functional message flow diagram for a single carrier (either IXC or LEC). The message flows are structured as function calls that pass messaging arguments. For example, the message Originate Request (Calling, Called) has the arguments "Calling" and "Called," which indicate the originating phone number and the destination phone number. The vertical posts designate an entity of the message flow. The entities illustrated are a subscriber 4 (origination), a called party 6 (termination), a receiver 30, a SI 20, a SF 50, a BIDR 40 and a BIDR 200.

The subscriber 4 originates an Originate Request(Calling, Called) message A that is transmitted to the signal receivers 30. The signal receivers 30 transmit an Originate Request (Calling, Called) message B to the SI 20. The SI 20 transmits a Request Route(Calling, Called) message C to the BIDR 40. The BIDR 40 returns a Route (Calling, Called, Charge) message D to the SI 20.

The BIDR 200 is queried by issuing an Originate Billing Query (Charge, Call Type Info) message F from SI 20 to the BIDR 200. The BIDR 200 issues an Originate Billing Response (Charge, Call Type Info) message G to the SI 20. The SI 20 submits a Terminate Request (Trunk) message E to the SF 50. The messaging sequence above is typical of call sequences presently used, with the exception of the Originate Billing Query Message F, and Originate Billing Response Message G.

To update the BIDR 200, an Originate Billing Update (Charge, Call Type Info) message H is issued from the SI 20 to the BIDR 200, alerting the BIDR 200 that a call has been established or terminated. The SF 50 issues a Terminate Request (called) message J to the party 6.

Optional periodic updates of the call status to the BIDR 200 from the SI 20 are available through the Billing Update (Charge, TPs) message K. The billing update can be conducted internally, in which the time for the call connection is calculated through the internal clock of the BIDR 200. Alternatively, billing updates are provided externally from the SI 20 on a periodic basis through a Billing Update (Charge, TPs) message K'. Either of these processes continue until a Clear Billing Update (Charge, TPs) message M is received by the BIDR 200.

A Disconnect Request message L is issued from the subscriber 4, typically by "hanging-up" the phone. A Disconnect Request message L' can also issue from the called party 6 by "hanging-up" the phone. A Disconnect Request message invokes the SI 20 to issue a Clear Billing Update (Charge, TPs) message M to the BIDR 200.

Figure 8A:
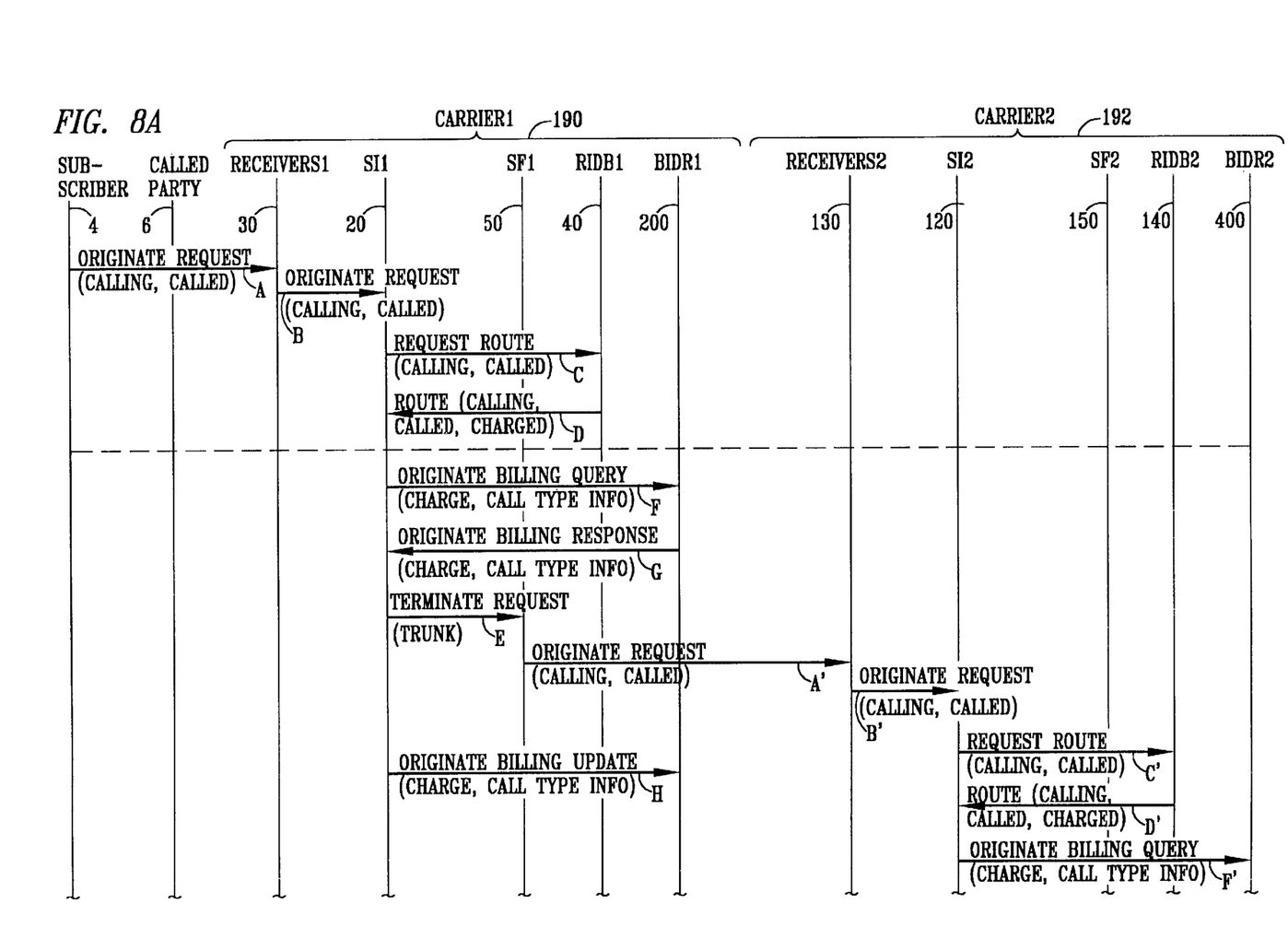
FIG. 8 is a billing update functional message flow diagram for multiple telecommunications network carriers having a billing administrator of the present invention.
Figure 8B:
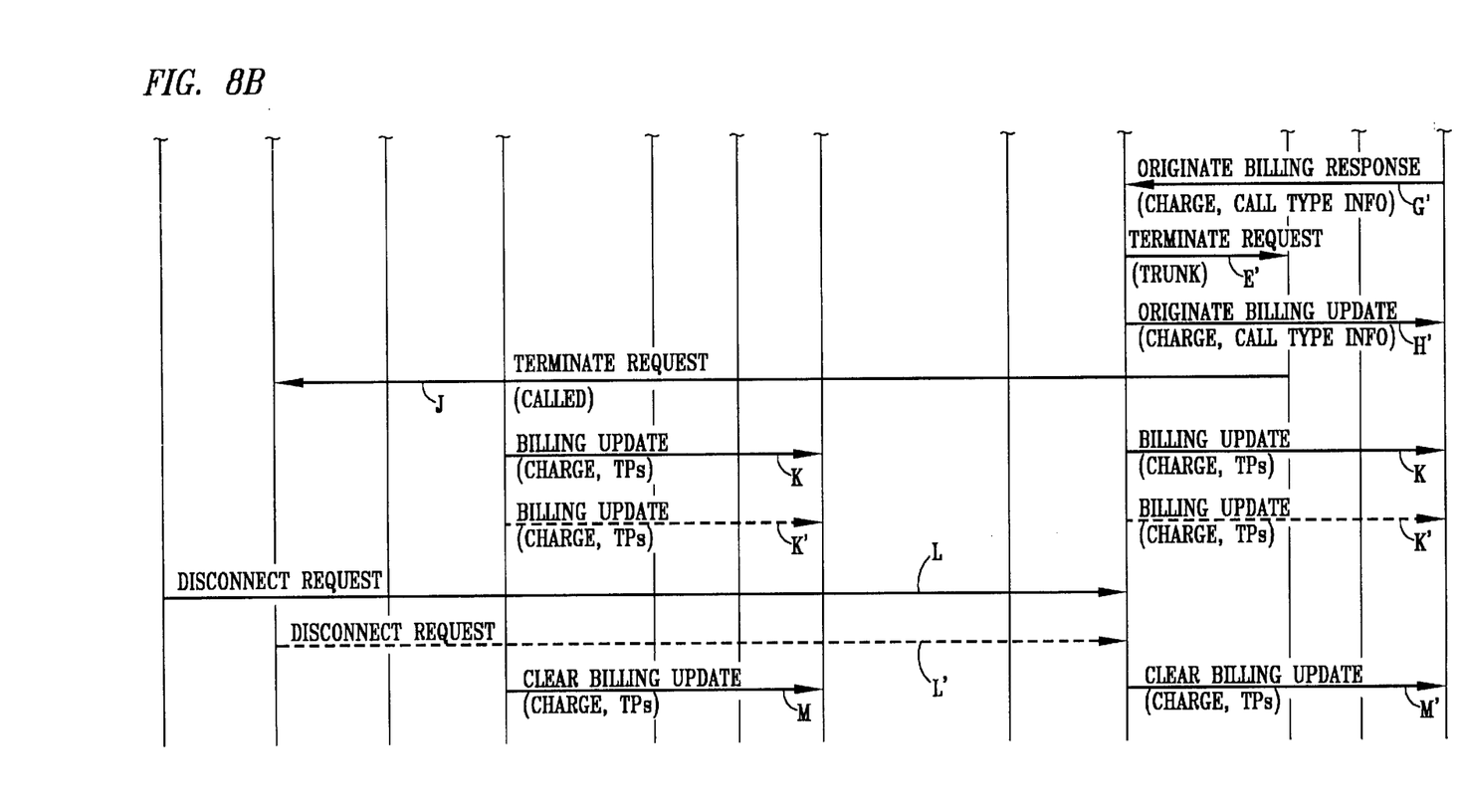

Referring to FIG. 8, shown is a billing update functional message flow diagram for a multiple carriers (IXC, LEC, or combination of both). Data communication between multiple carriers is accomplished through the receivers 30 and 130 of the telecommunication switches embodying the carriers. The messaging within each of the carriers is similar to that illustrated in FIG. 7. Accordingly, like reference nomenclature describes like messaging functions.

The message bridging between the first carrier 190 and the second carrier 192 is the Originate Request (Calling, Called) message A' from the SF1 50 to the Receivers2 130. With respect to the BIDR 200 and the BIDR2 800, billing updates are maintained on both carriers through a Billing Update (Charge, TPs) message K and K', as discussed above with respect to FIG. 7.

Upon a Disconnect Request message L''' from the originating party, subscriber 4, or a Disconnect Request Message L BIDR the terminating or called party 6, the final call charges are processed and stored in the BIDR 200 or the BIDR2 800, accordingly.

Thus, a call leg placed across multiple carriers has access to the information stored in the BIDR 200 and the BIDR2 800 to provide real-time billing information in that a total is provided to the subscriber 4 upon demand.

Figure 9:
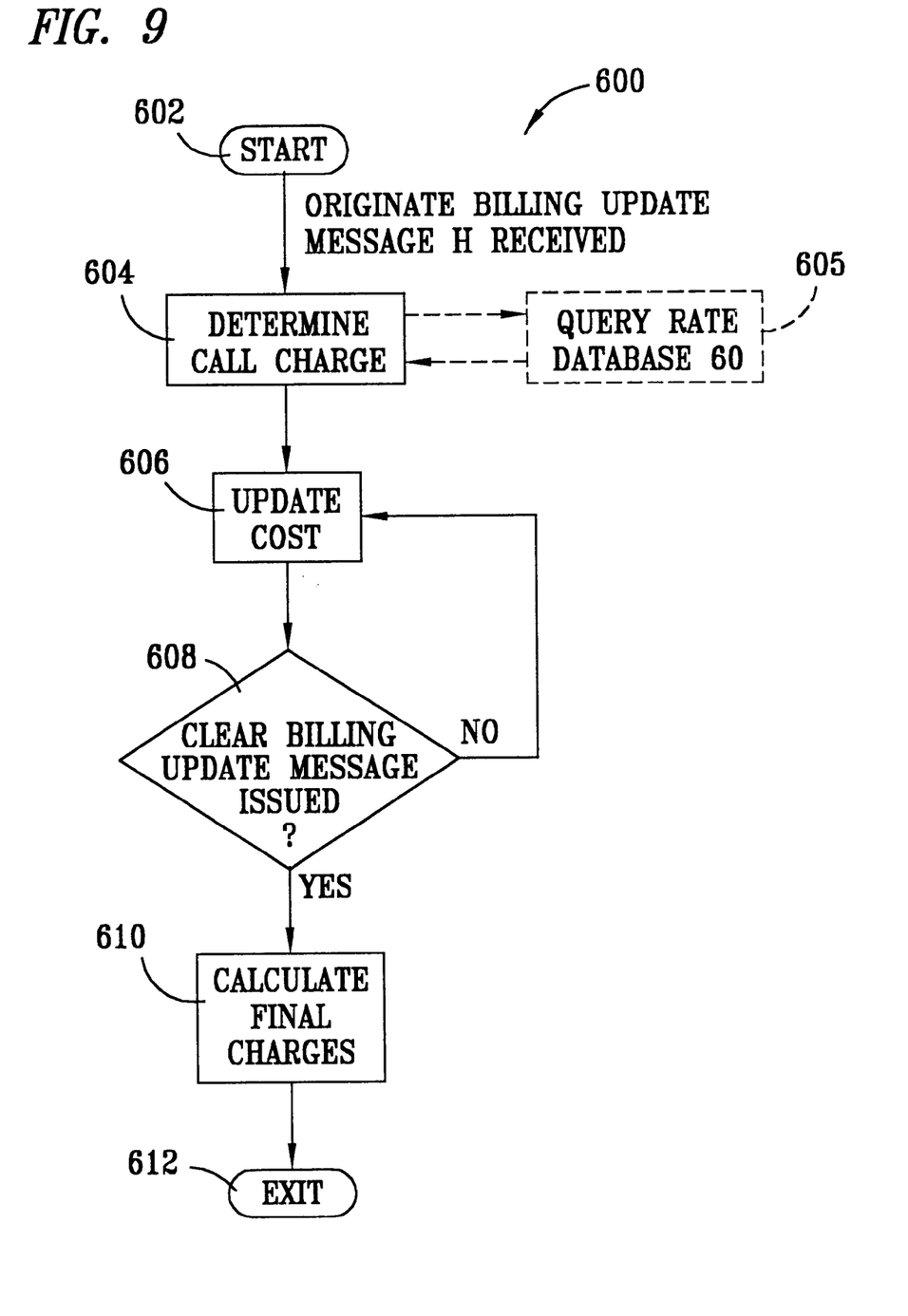
FIG. 9 presents a flow chart illustrating a billing update processing routine for the BIDR.

In FIG. 9, a flow chart illustrates the BIDR processing routine 600 when the Originate Billing Update (Charge, Call Type Info) message H is received by the BIDR 200. The processing routine 600 allows queries into other BIDRs across multiple carriers for the tally of billing data.

The processing routine 600 is executable by the billing processor 300 (see FIG. 1). Upon receipt of an Originate Billing Update (Charge, Call Type Info) message H in step 602, the call charge rate is determined in step 604. Queries to other carrier BIDRs or databases, such as rate database 60, are made as needed in step 605. That is, for example, in FIG. 8, when multiple carriers are involved in establishing the call leg between the subscriber 4 and the called party 6. Thus, the data on BIDR 200 and BIDR2 800 is, it is totaled by the processing routine 600 for announcement to the subscriber 4 on demand.

In step 606, the BIDR 200 is updated. Referring briefly back to FIG. 2, a call table structure 206 representing the call is updated with the pertinent information. The account table 204 is updated in the total cost field 210, the total time field 212, the cost quota field 214, and the time quota field 216.

In step 608, the BIDR 200 determines whether a Clear Billing Update (Charge, TPs) message has been issued. If not, then the BIDR 200 is updated again to reflect additional call billing information. If so, then the final charges are calculated in step 610, written to the BIDR 200 tables 206 and 204, and execution returns to step 602.

Thus, the data fields in the account table 204 and the call table 206 are updated to reflect the real-time billing information pertaining to a subscriber account number. Such real-time data provides greater flexibility to a user to manage expenses relating to call services.

Although the present invention and its advantages have been described in detail, it should be understood that various changes, substitutions and alterations can be made therein without departing from the spirit and scope of the invention as defined by the appended claims.

What is claimed is:

1. A telecommunications service billing administrator comprising:
   a billing information data repository having an account table and a call table, said billing information data repository configured to store a billing information record associated with a call in said call table, and said account table configured to store a current summary of said billing information record;
   a billing system having a processor, said billing system coupled to said billing information data repository, said billing system calculating and maintaining said summary of said billing information record, said summary stored in said account table;
   a user interface coupled to said billing system for establishing a communication link with a service subscriber via an access device selectively coupled to said user interface and for receiving a billing inquiry request, said billing system upon receipt of said billing inquiry request accessing said account table and announcing said summary in response to said billing inquiry request; and
   a network interface coupled to a telecommunications network, the network interface permitting the billing administrator to poll the telecommunications network for access request messages and permitting the telecommunications network to make an access request of said billing information data repository for real-time updates and queries of said billing information data repository.

2. The telecommunications service billing administrator of claim 1 wherein said summary responsive to said billing inquiry request is announced in a voice announcement form if a voice access device is used to access said billing system.

3. The telecommunications service billing administrator of claim 1 wherein said account table comprises:
   a subscriber account number key field that contains an account number for correlation to said billing inquiry request;
   a total call cost field for storing a total cost for a subscriber service rendered over a billing period;
   a total call time field for storing a total connection time cost for said subscriber service rendered over said billing period;
   a cost quota field storing a cost quota value; and
   a time quota field storing a time quota value.

4. The telecommunications service billing administrator of claim 3 wherein said billing system maintains said summary of said billing information record with a program executable on said billing system, said program executed in response to an update message, determines a call charge and updates said total call cost field of said account table with a call cost time and a call cost value until a clear billing update message is received by said billing system.

5. The telecommunications service billing administrator of claim 1 wherein said communication link is established by a security protocol.

6. The telecommunications service billing administrator of claim 5 wherein said security protocol is a password and a personal identification number.

7. The telecommunications service billing administrator of claim 1 wherein said service subscriber is a mobile cellular service subscriber.

8. The telecommunications service billing administrator of claim 1 further comprising:
   an administration interface coupled to said billing system;
   a customer maintenance input having a security system management function having a low-level security access coupled to said administration interface for establishing a communication link with said billing information data repository to create, modify, or delete a user billing account parameter definition; and
   a system administrator input having a restricted security access coupled to said administration interface for establishing a communication link with said billing information data repository to create, modify, or delete user billing account parameter definition.

9. A method for a real-time billing information query for a telecommunications service billing administrator having a billing system with a processor, said method comprising the steps of:
   maintaining a real-time total of billing services on a billing information data repository having an account table and a call table, wherein the step of maintaining a real-time total of billing services comprises the steps of:
      executing a billing information data repository update routine in response to an update message signifying the establishment of a call leg;
      determining a call charge; and
      repeatedly updating a total call cost field of the account table with a call cost time and a call cost value with respect to a duration of the call leg until a clear billing update message is received by the billing administrator; and
   announcing the real-time total in response to a user request, said user request being made via an access device selectively coupled to said billing administrator.

10. The method for a real-time billing information query of claim 9, wherein the step of announcing the real-time total in response to a user request comprises the steps of:
   accessing the billing administrator;
   submitting a real-time billing query request to the billing administrator; and
   responding to the query by announcing the current billing cost of a service for a billing period.

11. A method for a real-time billing information query for a telecommunications service billing administrator in at least a first and a second telecommunications networks, each of said first and second telecommunications networks including at least one of an interexchange carrier (IEC) and a local exchange carrier (LEC), and having a telecommunications service billing administrator having a billing system with a processor and a billing information data repository, said method comprising the steps of:
   maintaining a real-time total of billing services on both the billing information data repositories having an account table and a call table comprising the steps of:

executing a billing information data repository update routine in response to an update message signifying the establishment of a call leg;

determining a call charge; and repeatedly updating a total call cost field of the account table with a call cost time and a call cost value with respect to a duration of the call leg until a clear billing update message is received by the billing administrator; and announcing the real-time total in response to a user request, said user request being made via an access device selectively coupled to said billing administrator.

12. The method for a real-time billing information query of claim 11, wherein the step of announcing the real-time total in response to a user request comprises the steps of:

accessing the billing administrator;

submitting a real-time billing query request to the billing administrator; and responding to the query by announcing the current billing cost of a service for a billing period.

13. An apparatus for providing a real-time billing query comprising:

at least a first and a second telecommunications networks, each of said first and second telecommunications networks including at least one of an interexchange carrier (IEC) and a local exchange carrier (LEC), and having a telecommunications service billing administrator comprising:

a billing information data repository having an account table and a call table, said billing information data repository being coupled to an administration interface for management of billing accounts, said billing information data repository configured to store a billing information record associated with a call in said call table, and said account table configured to store a current summary of said billing information record;

a billing system having a processor, said billing system coupled to said billing data information repository, said billing system calculating and maintaining said summary of said billing information record, said summary stored in said account table;

a user interface coupled to said billing system for establishing a communication link with a service subscriber and for receiving a billing inquiry request, said billing system upon receipt of said billing inquiry request accessing said account table and announcing said summary responsive to said billing inquiry request;

a network interface coupled to a telecommunications network, the network interface permitting the billing administrator to poll the telecommunications network for access request messages and permitting the telecommunications network to make an access request of said billing information data repository for real-time updates and queries of said billing information data repository; and at least one receiver coupled to said billing system of each of the first and second telecommunications carriers; and said receiver of each of said telecommunications carriers coupled together to provide a data communication between said first and said second telecommunications carriers such that said billing information record of each of said carriers can be passed between said billing administrators of said at least two carriers.

14. An apparatus for providing a real-time billing query comprising:

at least a first and a second telecommunications networks, each of said first and second telecommunications networks including at least one of an interexchange carrier (IEC) and a local exchange carrier (LEC), and having a telecommunications service billing administrator comprising:

a billing information data repository having an account table and a call table, said billing information data repository being coupled to an administration interface for management of billing accounts, said billing information data repository configured to store a billing information record associated with a call in said call table, and said account table configured to store a current summary of said billing information record;

a billing system having a processor, said billing system coupled to said billing data information repository, said billing system calculating and maintaining said summary of said billing information record, said summary stored in said account table;

a user interface coupled to said billing system for establishing a communication link with a service subscriber and for receiving a billing inquiry request, said billing system upon receipt of said billing inquiry request accessing said account table and announcing said summary responsive to said billing inquiry request; and at least one receiver coupled to said billing system of each of the first and second telecommunications carriers;

said receiver of each of said telecommunications carriers coupled together to provide a data communication between said first and said second telecommunications carriers such that said billing information record of each of said carriers can be passed between said billing administrators of said at least two carriers; and wherein said telecommunications service billing administrator further comprising a network interface coupled to a telecommunications network, the network interface permitting the billing administrator to poll the telecommunications network for access request messages and permitting the telecommunications network to make an access request of said billing information data repository for real-time updates and queries of said billing information data repository.

* * * * *

UNITED STATES PATENT AND TRADEMARK OFFICE
CERTIFICATE OF CORRECTION

PATENT NO. : 6,317,490 B1
DATED : November 13, 2001
INVENTOR(S) : Cameron et al.

Page 1 of 1

It is certified that error appears in the above-identified patent and that said Letters Patent is hereby corrected as shown below:

Column 4,
Line 66, delete "("BIDR")" and insert -- "("RIDB") --

Column 5,
Line 6, delete "BIDR" and insert -- RIDB --
Line 28, delete "RIBD" and insert -- BIDR --
Line 30, delete "RIBD" and insert -- BIDR --
Line 33, delete "RIBD" and insert -- BIDR --
Line 35, delete "RIBD" and insert -- BIDR --
Line 50, delete "BIDR" and insert -- RIDB --
Line 56, delete "BIDR" and insert -- RIDB --
Line 57, delete "BIDR" and insert -- RIDB --

Column 6,
Line 58, delete "is, it"

Column 7,
Line 4, delete "602" and insert -- 612 --

Signed and Sealed this

Nineteenth Day of March, 2002

Attest:

JAMES E. ROGAN
*Attesting Officer*    *Director of the United States Patent and Trademark Office*